United States Patent [19]

Tolle, Jr.

[11] 4,049,512

[45] Sept. 20, 1977

[54] CATHODE STRUCTURE FOR ELECTROLYTIC APPARATUS EMPLOYING IMPELLERS

[76] Inventor: Albert E. Tolle, Jr., 4553 Arrowhead, Baton Rouge, La. 70808

[21] Appl. No.: 627,599

[22] Filed: Oct. 31, 1975

[51] Int. Cl.$^2$ .................... C25D 17/12; C25D 21/10
[52] U.S. Cl. .................................. 204/212; 204/222; 204/275
[58] Field of Search ............... 204/212, 222, 280, 273, 204/275

[56] References Cited

U.S. PATENT DOCUMENTS

| | | | |
|---|---|---|---|
| 1,066,570 | 7/1913 | Avery | 204/212 |
| 3,342,718 | 9/1967 | Adams | 204/212 |
| 3,458,425 | 7/1969 | Tolle et al. | 204/280 |
| 3,560,366 | 2/1971 | Fisher | 204/212 |
| 3,583,897 | 6/1971 | Fulweiler | 204/212 |
| 3,909,368 | 9/1975 | Raymond et al. | 204/26 |

FOREIGN PATENT DOCUMENTS 817,912  8/1959  United Kingdom ................. 204/212

Primary Examiner—T. M. Tufariello
Attorney, Agent, or Firm—David L. Ray; Edgar E. Spielman, Jr.

[57] ABSTRACT

An apparatus for electrolytically extracting metals from salts in solution including a novel cathode structure which greatly increases the rate of extraction is disclosed. More specifically, the novel cathode structure comprises a shaft having a plurality of flexible circular members mounted in spaced relation thereon. The members have impellers thereon for circulating the solution about the anodes and cathodes. The concave members are sufficiently flexible that they may be easily everted so as to cause the metal deposited thereon to pop off. One preferred embodiment includes a tube inlet which prevents plating of silver in a connected feed tank.

5 Claims, 4 Drawing Figures

CATHODE STRUCTURE FOR ELECTROLYTIC APPARATUS EMPLOYING IMPELLERS

BACKGROUND OF THE INVENTION

This invention relates to electrolytic apparatuses in general, and, more particularly, to electrolytic apparatuses for extracting metal from metal salts in solution by causing the electrolytic deposition of free metal upon the cathode structure.

One application of such electrolytic apparatuses has been the removal of silver from photographic solutions such as hypo solutions. In such apparatuses it is common to provide a rotatable cathode structure so that the surface of the cathode structure can be maintained in constant motion with respect to the hypo solution, thereby providing for the uniform deposition of the silver on the survade of the cathode structure and to prevent the accumulation of reaction products in the hypo solution in the vicinity of the cathode.

One type of prior art cathode structure comprises a rotatable shaft extending into the solution and a plurality of flat discs mounted on said shaft in parallel spaced relation along the length thereof. The entire assembly is electrically conductive and acts as the cathode for the electrolytic process, silver being deposited on all surfaces thereof. See U.S. Pat. No. 3,458,425.

In structures of the prior art, extraction rates are commonly very low, and several extractors are frequently necessary when large amounts of solution are processed. Hence, it is apparent that the increase in the extraction rate would eliminate unnecessary units and would result in improved efficiency.

SUMMARY OF THE INVENTION

The present invention provides an apparatus for electrolytically extracting metals from metal salts in solution including a cathode structure comprising an electrically conductive shaft extending into the solution to be processed, a plurality of non-conductive annular spacers adapted to fit over said shaft and protect it from contact with the solution, and a plurality of electrically conductive flexible members having impellers thereon mounted concentrically on said shaft and maintained in spaced relation along the length of the spacers. The members are made to be sufficiently flexible that they may cause the deposited metal to pop off, preferably by flexing and bending. The non-conductive spacers prevent metal from being deposited on the shaft itself. One preferred embodiment includes a tube inlet which prevents plating of silver in a connected feed tank.

One of the many advantages of this invention is that, as a result of the speed with which metal is deposited on the cathode structure, the overall efficiency of the apparatus is enhanced.

DESCRIPTION OF THE PREFERRED EMBODIMENT

Figure 1:
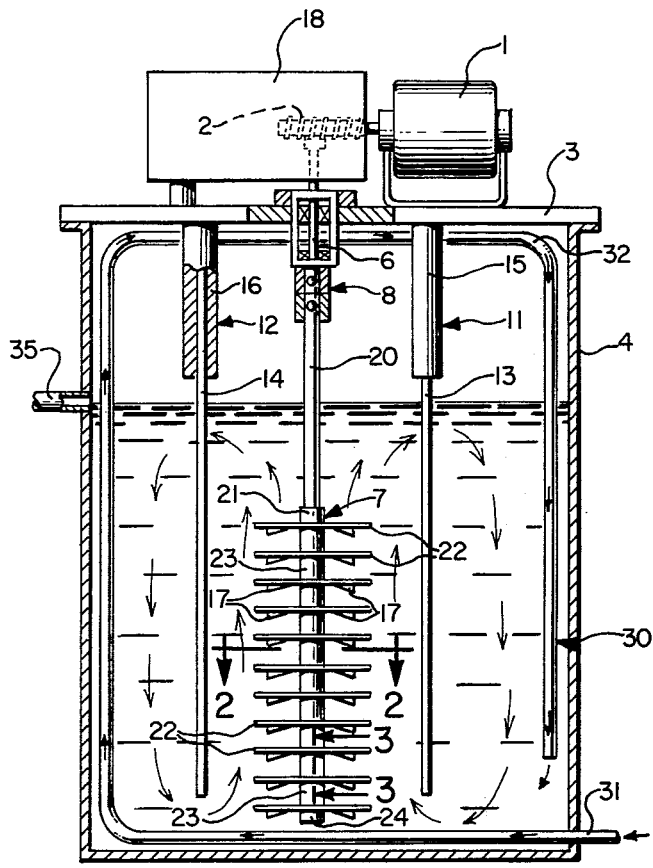
FIG. 1 is an elevational view, partly in cross-section, of an apparatus for extracting metals from salts in solution.

Referring now to FIG. 1, there is shown an apparatus suitable for electrolytically extracting metals from salts in solution. In general the apparatus includes a motor 1 which is connected to a speed reduction worm gear 2. Motor 1 is supported by base plate 3 which is constructed to fit over the top of tank 4 which contains the solution to be processed such as, for example, a hypo solution. Base plate 3 may be made of any suitable material which will not be attacked by the solution to be processed and which will insulate the cathode and anode elements of the apparatus from each other. For example, base plate 3 may be made of polymerized methyl methacrylate, such as Lucite, which possesses an additional advantage in that it permits a viewing of the elements in operation.

Also shown in FIG. 1 is inlet tube 30 and outlet tube 35. The solution to be processed flows into tube 30 through inlet 31 and into tank 4 in the direction indicated by the arrows. The solution is removed from the tank through outlet 35. The solution being processed enters tube 30 from a holding tank (not shown). Tubes 30 and 35 may be omitted if one desires to operate the apparatus on a batch basis rather than on a continuous basis.

To prevent plating out of the solution in the holding tank, inlet tube or conduit 30 is made of an electrically non-conductive material or insulator such as plastic, synthetic rubber, or the like, and a portion 32 of the tube 30 is located above the surface of the solution contained in tank 4. As can be seen in the drawings, the portion 32 of tube 30 above the surface of the solution is located between the inlet end 31 and outlet end of tube 30. An air space or chamber occurs in portion 32 of tube 30 to prevent or minimize electrical contact with the holding tank and resultant plating. Also, if desired, the outlet end of tube 30 can be located above the surface of the solution to prevent or minimize electrical contact with the holding tank.

Output shaft 6 of speed reduction gear 2 projects downward through a suitable opening in base plate 3. Rotatable cathode structure 7 is connected to output shaft 6 by means of a suitable coupling 8, thereby permitting a shearing between elements of said structure and the solution.

A pair of anodes 11 and 12 project downward into the solution from base plate 3. The anodes 11 and 12 include carbon rods 13 and 14 which are press fitted into plastic rod holders 15 and 16 which are in turn mounted on base plate 3. Carbon rods 13 and 14 may be ordinary welding rods tapped at their upper ends to receive suitable threaded electrical conductors, which in turn may be connected to a power source.

The apparatus includes suitable means for applying a DC voltage between the cathode structure 7 and the anodes 11 and 12 so as to carry out the electrolytic process. FIG. 1 shows rectifier box 18 mounted on base plate 3 for converting generally available AC electrical power to the DC power required for the purpose of the electrolytic process. The positive voltage output from rectifier 18 is applied to the carbon rods 13 and 14 of anode elements 11 and 12 by means of suitable conductors (not shown). The negative output voltage from rectifier 18 is applied to the rotable cathode structure 7 by means of a similar conductor (not shown). It is to be understood, however, that although rectifier 18 is shown in the preferred embodiment of the apparatus, other means for supplying a DC voltage between the anodes 11 and 12 and the cathode structure 7 may be employed within the scope and spirit of the present invention. For example, a DC voltage might be supplied by means of a battery.

Referring in greater detail to cathode structure 7 shown in FIG. 1, shaft 20 may be made of any suitable material which is both electrically conductive and also preferably resistant to corrosive effects of the solution to be processed. For example, in the preferred embodiment of the present invention, shaft 20 is made of stainless steel. Collar 21 is fixedly mounted on shaft 20 so as to hold members 22 in position. Collar 21 may be made of any material which will not be attacked by the solution to be processed. In addition, it may be deemed desirable that collar 21 be made of a non-conductive material so as to prevent the deposition of metal thereon. For example, collar 21 may be made of plastic.

Figure 2:
FIG. 2 is a plan view of one of the conductive members of the cathode structure.
Figure 3:
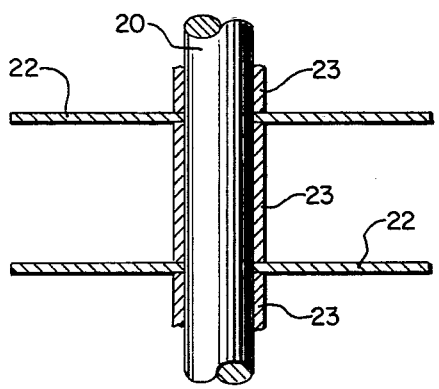
FIG. 3 is a detailed cross-section taken along lines 3—3 of FIG. 1 of a portion of the cathode structure showing the conductive members in their normal condition.

As shown in FIGS. 2 and 3, cathode members 22 are provided with suitable holes or openings at their centers so as to permit them to slide onto shaft 20. Members 22 are made of a suitable electrically conductive and corrosion resistant material such as, for example, stainless steel. Further, cathode members 22 are in electrical contact with shaft 20 and are maintained in spaced relation by means of spacers 23 which may be made of a suitable corrosion resistant material, and the exterior surfaces of the spacers may be non-conductive so as to prevent a deposition of metal thereon. For example, spacers 23 may be made of section of plastic pipe pressed over stainless steel. Preferably, spacers 23 are electrically conductive to provide better electrical contact of shaft 20 with members 22.

Cathode members 22 and spacers 23 are secured on shaft 20 by means of nut 24 which threadedly engages shaft 20 at the lower extremity thereof. The tightening of nut 24 forces cathode members 22 and spacers 23 against collar 21, and the resulting tight fit between the elements serves to provide a seal which protects shaft 20 from the solution to be processed and thereby prevents metal from being deposited thereon.

Figure 4:
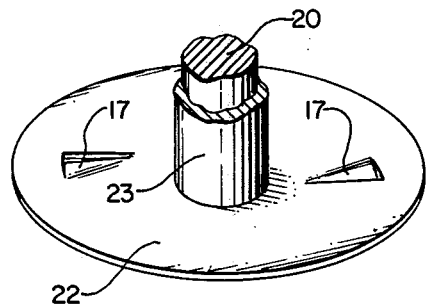
FIG. 4 is a partly sectional, perspective view of a portion of the cathode structure showing a conductive member and a spacer.

As can be seen in FIGS. 1, 2 and 4, the cathode member 22 has impellers 17 thereon which circulate the solution in tank 4, as shown by the arrows, when cathode member 22 is rotating in a clockwise manner, as shown by the arrow in FIG. 2. Impellers 17 are formed by making an L-shaped incision in cathode member 22 and pushing the metal severed downward to form a fin or impeller 17.

The provision of such impellers in cathode member 22 greatly increases the deposition efficiency of the apparatus. This difference in efficiency is believed to be caused by the improved circulation of the hypo fluid over cathode members 22 due to the provision of impellers 17 on the cathode plates. Further increases in plating efficiency can be achieved by incorporating two additional anodes identical to 11 and 12 on opposite sides of shaft 20, equidistant from cathodes 11 and 12, for a total of four anodes. Thus, in effect, a 360° field is provided around the cathode 7. The provision of four anodes in a 360° field configuration is preferred.

Cathode 7, if desired, may be removed from the solution and the individual plates removed, cleaned, flexed and scraped to remove the deposits thereon. The metal on cathode member 22 indicated by dots in FIG. 2 may be removed by flexing cathode members 22 without removal of individual plates. If desired, cathode member 22 may be made in a concave configuration, as taught in U.S. Pat. No. 3,458,425 which is hereby incorporated by reference. Such concave members may have impellers cut therein as is shown in the present invention. The metal may then be removed by everting the concave members to cause the deposited metal to pop off, as is taught in U.S. Pat. No. 3,458,425.

In the preferred embodiment of this invention, the cathode members 22 are circular in shape with a diameter of approximately 6 inches, and a thickness of approximately .024 inches. The length 17a of the longest edge of the impeller 17 may vary from about 1 inch to about 1½ inches. The shortest length 17b of the impeller 17 may vary from about ½ inch to about ¾ inch. The impellers 17 are bent downwardly as far as desired in order to achieve a desired flow rate therethrough. It will be understood that impellers 17 may be cut in slightly different configurations as long as the configurations provide for an agitation of the hypo solution sufficient to cause the hypo solution to flow upwards, through, and over the cathode members 22.

It will be appreciated by those skilled in the art that although in the preferred embodiment of this invention members 22 are connected to the DC power source through electrically conductive shaft 20, other means for supplying DC power to members 22 may be employed. Further, although the invention has been illustrated by reference to apparatus including a rotatable cathode structure 7, it will be understood that the principles of the invention are equally applicable to static electrode structures. It will also be apparent that other modifications and adaptations of the apparatus may be made without departing from the spirit and scope of the invention as set forth with particularity in the appended claims.

What is claimed is:

1. An apparatus for electrolytically extracting metal from salts in a solution on a continuous basis comprising:
    a. tank means containing
        i. electrically non-conductive conduit means connected thereto for conveying said solution from holding tank means to said tank means, a portion of said conduit means being located above the surface of the solution contained in said tank means to prevent electrical contact between said tank means and said holding tank means, and
        ii. drain outlet means located a distance beneath said portion of said conduit means to prevent said portion of said conduit means from being totally immersed in said solution,
    b. an electrically conductive shaft means extending into said solution in said tank means,
    c. a plurality of annular spacer means mounted on said shaft means,
    d. a plurality of electrically conductive cathode member means rigidly mounted along said shaft means and maintained in spaced relation along the length thereof by said spacer means, said cathode member means being mounted so that the principal planes of said cathode member means are perpendicular to said shaft means, said cathode member means having impeller means connected thereto for circulating said solution about said cathode member means, e. means for rotating said shaft means and said circular cathode member means, f. at least one elongated anode member means extending into said solution in said tank means adjacent the peripheral edges of said cathode member means, and g. means for applying a DC voltage between said cathode member means and said anode member means.

2. The apparatus of claim 1 wherein said cathode member means are circular in shape.

3. The apparatus of claim 1 wherein there are at least four of said anode member means spaced equidistantly around said cathode members.

4. The apparatus of claim 1 wherein said shaft means is made of a corrosion resistant material.

5. The apparatus of claim 1 wherein said impeller means comprises triangular openings in said cathode member means and a triangular piece of metal bent downwardly a distance sufficient to achieve a desired flow rate through said opening.

* * * * *